Patented June 19, 1928. 1,674,342

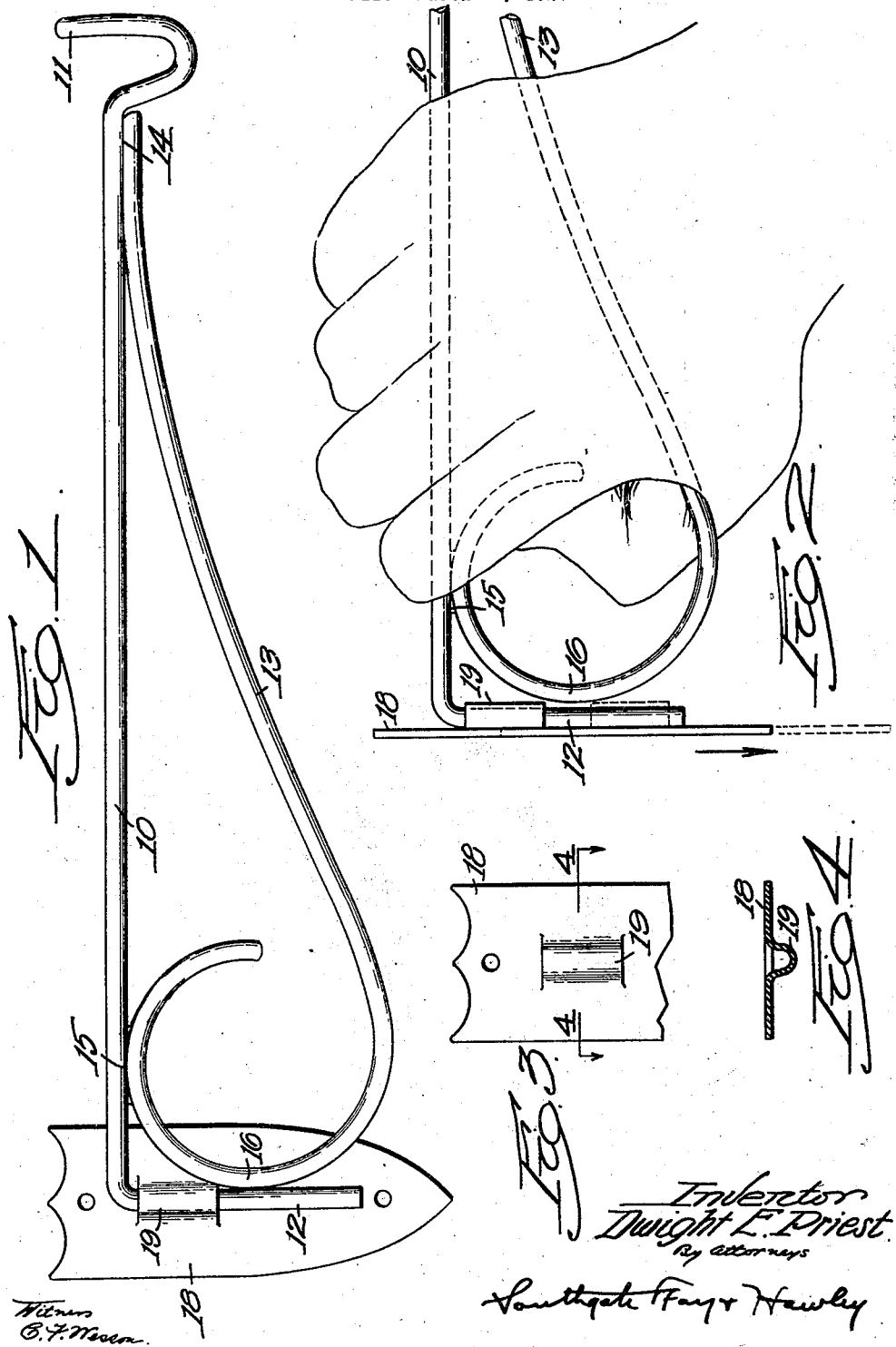

UNITED STATES PATENT OFFICE.

DWIGHT E. PRIEST, OF WORCESTER, MASSACHUSETTS, ASSIGNOR TO PARKER WIRE GOODS CO., OF WORCESTER, MASSACHUSETTS, A CORPORATION OF MASSACHUSETTS.

BIRD-CAGE HOOK.

Application filed March 16, 1927. Serial No. 175,861.

This invention relates to a bird cage hook of the type in which the hook member is supported by a wall plate and is pivoted to swing thereon. It is the general object of my invention to provide a bird cage hook of the type above described which is simple in construction and easily assembled and which may be manufactured at a relatively low cost.

With this general object in view, a particular feature of my invention relates to the provision of an improved construction by which the hook member and wall plate may be readily assembled or separated, while at the same time accidental separation of these parts is effectively prevented.

A further object is to provide a construction in which the parts may be assembled or separated manually and without requiring the use of tools for this purpose.

My invention further relates to arrangements and combinations of parts which will be hereinafter described and more particularly pointed out in the appended claims.

A preferred form of the invention is shown in the drawings in which

Fig. 1 is a side elevation of my improved bird cage hook;

Fig. 2 is a partial side elevation, illustrating the manner of assembling or separating the parts;

Fig. 3 is a partial elevation of the wall plate, and

Fig. 4 is a sectional plan view, taken along the line 4—4 in Fig. 3.

Referring to the drawings, my improved bird cage hook comprises a hook member having a main supporting portion 10 terminating in a hook 11, an offset pivot portion 12, and a brace member 13. The brace member 13 is welded or otherwise permanently secured to the supporting member 10 at a point 14 near the outer end thereof.

The brace member 13 extends downwardly and has its inner end formed in the segment of a circle, welded or otherwise permanently secured to the supporting member 10 at the point 15. The curved portion 16 of the brace 13 substantially engages the offset pivot member 12, as shown in Fig. 1, when in normal position.

A wall plate 18 is provided with a bearing portion 19, preferably formed by displacing the portion 19 forwardly from the body of the plate 18 by a pressing or punching operation.

When the parts are assembled as shown in Fig. 1, the offset pivot portion 12 extends through the bearing portion 19 and is engaged by the brace portion 16 below the bearing 19. Such engagement prevents upward displacement of the hook relative to the wall plate and also affords a firm support for the hook 11.

When it is desirable to separate the hook and the wall plate, this may be readily done as illustrated in Fig. 2 by grasping the portions 10 and 13 of the hook member firmly in the hand and forcing them toward each other, which will have the effect of drawing the curved portion 16 away from the offset portion 12 by an amount sufficient to permit the bearing 19 to be slipped outward between the portions 12 and 16. Such movement of the plate 18 and bearing 19 downward is indicated in dotted lines in Fig. 2.

This arrangement by which the parts may be readily assembled or separated without the use of tools is of particular advantage in the process of manufacture, as it permits both the hook member and the wall plate to be polished and lacquered before the parts are assembled, and also permits the parts to be shipped separately if so desired. Furthermore, when in assembled relation, the brace member 13 supports the hook 11 in such a manner that the hook is of exceptionally strong and rigid construction.

Having thus described my invention and the advantages thereof, I do not wish to be limited to the details herein disclosed otherwise than as set forth in the claims, but

What I claim is:—

1. A bird cage hook comprising a wall plate, and a hook member pivoted thereto, said wall plate having a bearing portion, and said hook member having an offset depending pivot portion seated therein and having a brace normally engaging said offset pivot portion below said bearing portion when in assembled relation, said brace being yieldingly removable manually from such engaging position to permit assembling or separation of said hook member and wall plate.

2. A bird cage hook comprising a wall plate, and a hook member pivoted thereto, said plate having a bearing portion, and said hook member having a main supporting portion, an offset depending pivot portion, and a depending spring brace secured to said main supporting portion at points adjacent each end thereof, said spring brace projecting downwardly and being reversely curved at its inner end to normally engage said offset portion of said hook member below said bearing portion of said wall plate when assembled therewith, and said spring brace being effective to yieldingly prevent separation of said wall plate and hook member.

3. A bird cage hook comprising a wall plate, and a hook member pivoted thereto, said plate having a bearing portion, and said hook member having a main supporting portion, an offset depending pivot portion, and a spring brace secured to said main supporting portion, said spring brace having a depending portion terminating in a segmental inner portion with the end thereof projecting outwardly, both ends of said brace being permanently secured to said main supporting portion, and the inner segmental curved portion of said brace normally engaging said offset pivot portion below said bearing portion when the parts are assembled, but said segmental portion being yieldingly movable laterally away from said pivot portion to permit separation of the parts of said hook by manual compression of the portions of said hook member which are substantially spaced from said wall plate and pivot bearing.

In testimony whereof I have hereunto affixed my signature.

DWIGHT E. PRIEST.